(12) United States Patent
Fernandez-Dorado et al.

(10) Patent No.: US 10,937,183 B2
(45) Date of Patent: Mar. 2, 2021

(54) OBJECT DIMENSIONING SYSTEM AND METHOD

(71) Applicant: COGNEX CORPORATION, Natick, MA (US)

(72) Inventors: José Fernandez-Dorado, Aachen (DE); Emilio Pastor Mira, Aachen (DE); Francisco Azcona Guerrero, Aachen (DE); Ivan Bachelder, Hillsborough, NC (US); Laurens Nunnink, Simpelveld (NL); Torsten Kempf, Aachen (DE); Savithri Vaidyanathan, Hopkinton, MA (US); Kyra Moed, Hopkinton, MA (US); John Bryan Boatner, Andover, MA (US)

(73) Assignee: COGNEX CORPORATION, Natick, MA (US)

( * ) Notice: Subject to any disclaimer, the term of this patent is extended or adjusted under 35 U.S.C. 154(b) by 43 days.

(21) Appl. No.: 16/259,761

(22) Filed: Jan. 28, 2019

(65) Prior Publication Data

US 2020/0242793 A1 Jul. 30, 2020

(51) Int. Cl.
| | | |
|---|---|---|
| *G06T 7/60* | (2017.01) | |
| *G06T 7/62* | (2017.01) | |
| *G06T 7/70* | (2017.01) | |
| *G06F 3/0488* | (2013.01) | |
| *G01B 11/26* | (2006.01) | |
| *G06T 7/13* | (2017.01) | |
| *G01B 11/02* | (2006.01) | |

(52) U.S. Cl.
CPC .............. *G06T 7/62* (2017.01); *G01B 11/026* (2013.01); *G01B 11/26* (2013.01); *G06F 3/04883* (2013.01); *G06T 7/13* (2017.01); *G06T 7/70* (2017.01)

(58) Field of Classification Search
CPC .... G06T 7/62; G06T 7/70; G06T 7/13; G01B 11/026; G01B 11/26; G06F 3/04883
See application file for complete search history.

(56) References Cited

U.S. PATENT DOCUMENTS

| | | |
|---|---|---|
| 5,699,161 A | 12/1997 | Woodworth |
| 6,088,106 A | 7/2000 | Rockseisen |
| 6,795,200 B1 | 9/2004 | Barman et al. |
| 7,342,669 B2 | 3/2008 | Kawasaki et al. |
| 9,239,950 B2 | 1/2016 | Fletcher |
| 9,464,885 B2 | 10/2016 | Lloyd et al. |

(Continued)

FOREIGN PATENT DOCUMENTS

WO  2013026180 A1  2/2013

OTHER PUBLICATIONS

PCT International Search Report and Written Opinion, PCT/US2020/015203, dated Apr. 16, 2020, 18 pages.

(Continued)

*Primary Examiner* — Neil R McLean
(74) *Attorney, Agent, or Firm* — Quarles & Brady LLP

(57) ABSTRACT

Determining dimensions of an object can include determining a distance between the object and an imaging device, and an angle of an optical axis of the imaging device. One of more features of the object can be identified in an image of the object. The dimensions of the object can be determined based upon the distance, the angle, and the one or more identified features.

20 Claims, 11 Drawing Sheets

(56) References Cited

U.S. PATENT DOCUMENTS

| | | | |
|---|---|---|---|
| 9,779,546 | B2 | 10/2017 | Hunt et al. |
| 9,803,975 | B2 | 10/2017 | Moed et al. |
| 9,841,311 | B2 | 12/2017 | McCloskey et al. |
| 2002/0118874 | A1 | 8/2002 | Chung et al. |
| 2008/0204765 | A1 | 8/2008 | Hoffmann et al. |
| 2009/0323084 | A1 | 12/2009 | Dunn et al. |
| 2013/0201563 | A1* | 8/2013 | Nunnink ............ G02B 27/1066 359/618 |
| 2013/0278552 | A1* | 10/2013 | Kamin-Lyndgaard ....................... G06F 3/0416 345/174 |
| 2013/0329013 | A1 | 12/2013 | Metois et al. |
| 2014/0021259 | A1 | 1/2014 | Moed et al. |
| 2014/0100813 | A1 | 4/2014 | Showering |
| 2015/0178538 | A1 | 6/2015 | Gerst, III et al. |
| 2016/0044301 | A1 | 2/2016 | Jovanovich et al. |
| 2016/0061594 | A1* | 3/2016 | Kim ....................... G01B 11/26 348/302 |
| 2017/0018094 | A1 | 1/2017 | Todeschini |
| 2017/0023353 | A1* | 1/2017 | Moed ................... G06K 7/1417 |
| 2018/0018820 | A1 | 1/2018 | Hunt et al. |
| 2018/0073914 | A1 | 3/2018 | McCloskey et al. |
| 2018/0106596 | A1 | 4/2018 | Ackley et al. |
| 2018/0108136 | A1* | 4/2018 | Lai .......................... G06T 7/194 |

OTHER PUBLICATIONS

Ascending Technologies, Google's Project Tango Feat—AscTec Firely, 2014, 3 pages.

Bussi Demagnetizing Systems, Demagnetizers in Line Installed in Flexible Conveyor Chains, "D-F", "D-R", "D-B" Series and Similar, Copyright 2017, 2 pages.

Bussi Demagnetizing Systems, Demagnetizers in Line and Off Line With Conveyor Belt, "DU" Series, http://www.bussi-demagnetizers.com/en/53/demagnetizers-in-line-and-off-line-with-conveyor-belt, Copyright 2017, 2 pages.

Criminisi, et al., Single View Metrology, International Journal of Computer Vision, 2000, 40(2):123-148.

EDGE3 Technologies, Homepage, http://edge3technologies.com, Copyright 2019, 4 pages.

Fernandes, et al., Computing Box Dimensions From Single Perspective Images in Real Time, In XVIII Brazilian Symposium on Computer Graphics and Image Processing (SIBGRAPI'05), IEEE, 2005, pp. 155-162.

IFM Electronic GMBH, Industrial 3D Cameras, Copyright 2019, 6 pages.

IFM Electronic GMBH, Imaging Technology, Copyright 2019, 5 pages.

Kickstarter, Spike: Laser Accurate Measurement & Modeling on Smartphones, Copyright 2019, 25 pages.

Kyto, et al., Method for Measuring Stereo Camera Depth Accuracy Based on Stereoscopic Vision, In Three-Dimensional Imaging, Interaction, and Measurement, International Society for Optics and Photonics, 2011, 7864:78640I, 9 pages.

Nakai, et al., 3D Shape Measurement by Sweeping Hand-Held Light Striping Range Finder, Technical White Paper, May 2014, 6 pages.

Pertuz, et al., Analysis of Focus Measure Operators for Shape-From-Focus, Pattern Recognition, 2013, 46 (5)1415-1432.

* cited by examiner

OBJECT DIMENSIONING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to determining the dimensions of objects.

BACKGROUND OF THE INVENTION

In many contexts, it may be useful to determine the dimensions of objects, such as parallelepipeds or other boxes. For example, to optimize packing and shipping operations, it may be useful to determine the three-dimensional size of particular products or packaging. In some cases, objects to be dimensioned may be stationary. In some cases, the objects may be moving.

SUMMARY OF THE INVENTION

Some embodiments of the invention provide a method for determining dimensions of an object, for use with an imaging system. The imaging system can include an optical arrangement with an imaging sensor, a lens arrangement that defines an optical axis and a field-of-view that at least partly includes the object, and a sensor-lens distance between the imaging sensor and a focusing lens of the lens arrangement. An object-imaging distance can be determined as a distance between the object and a part of the lens arrangement. An axis angle can be determined as an angle of the optical axis relative to a reference frame. An image of the object can be acquired using the imaging system. Using a processor device, one or more features of the object within the image can be identified. Using the processor device, one or more of the dimensions of the object can be identified, based upon at least the object-imaging distance, the axis angle, and the one or more identified features of the object.

Some embodiments of the invention provide a system for determining dimensions of an object. An imaging system can include an imaging sensor, and a lens arrangement that includes a lens and defines an optical axis, a field-of-view that at least partly includes the object, and a sensor-lens distance between the imaging sensor and the lens of the lens arrangement. A processor device can be configured to execute operations that include: determining an object-imaging distance as a distance between the object and the lens arrangement; determining an axis angle as an angle of the optical axis relative to a reference frame; and acquiring an image of the object using the imaging system. The operations can further include: identifying one or more features of the object within the image; and determining one or more of the dimensions of the object based upon at least the object-imaging distance, the axis angle, and the one or more identified features of the object.

Some embodiments of the invention provide a mobile system for determining dimensions of an object. A mobile housing can support an imaging sensor, a lens arrangement, a range finder configured to measure a distance to the object, an angular sensor configured to measure a spatial orientation of the mobile system, and a processor device. The lens arrangement can include a lens and can define an optical axis and a sensor-lens distance between the imaging sensor and the lens. The processor device can be configured to execute operations that include: determining an object-imaging distance as a distance between the object and the lens arrangement, based upon the distance measured by the range finder; and determining an axis angle as an angle of the optical axis relative to the support surface, based upon the spatial orientation measured by the angular sensor; acquiring an image of the object using the imaging system. The operations can further include: identifying one or more features of the object within the image based upon at least one of using a machine vision system to identify one or more of an edge, a corner, or a facet of the object within the image or receiving a user input on a touchscreen of the mobile system that identifies one or more of an edge, a corner, or a facet of the object within the image; and determining one or more of the dimensions of the object based upon at least the object-imaging distance, the axis angle, and the one or more identified features of the object.

To the accomplishment of the foregoing and related ends, embodiments of the invention can include one or more of the features hereinafter fully described. The foregoing and following description and the annexed drawings set forth in detail certain example aspects of the invention. However, these aspects are indicative of but a few of the various ways in which the principles of the invention can be employed. Other aspects, advantages and novel features of the invention will become apparent from the detailed description herein as considered along with the drawings.

BRIEF DESCRIPTION OF THE DRAWINGS

The features and advantages of the invention are apparent from the following description taken in conjunction with the accompanying drawings in which.

DETAILED DESCRIPTION OF THE INVENTION

Figure 1:
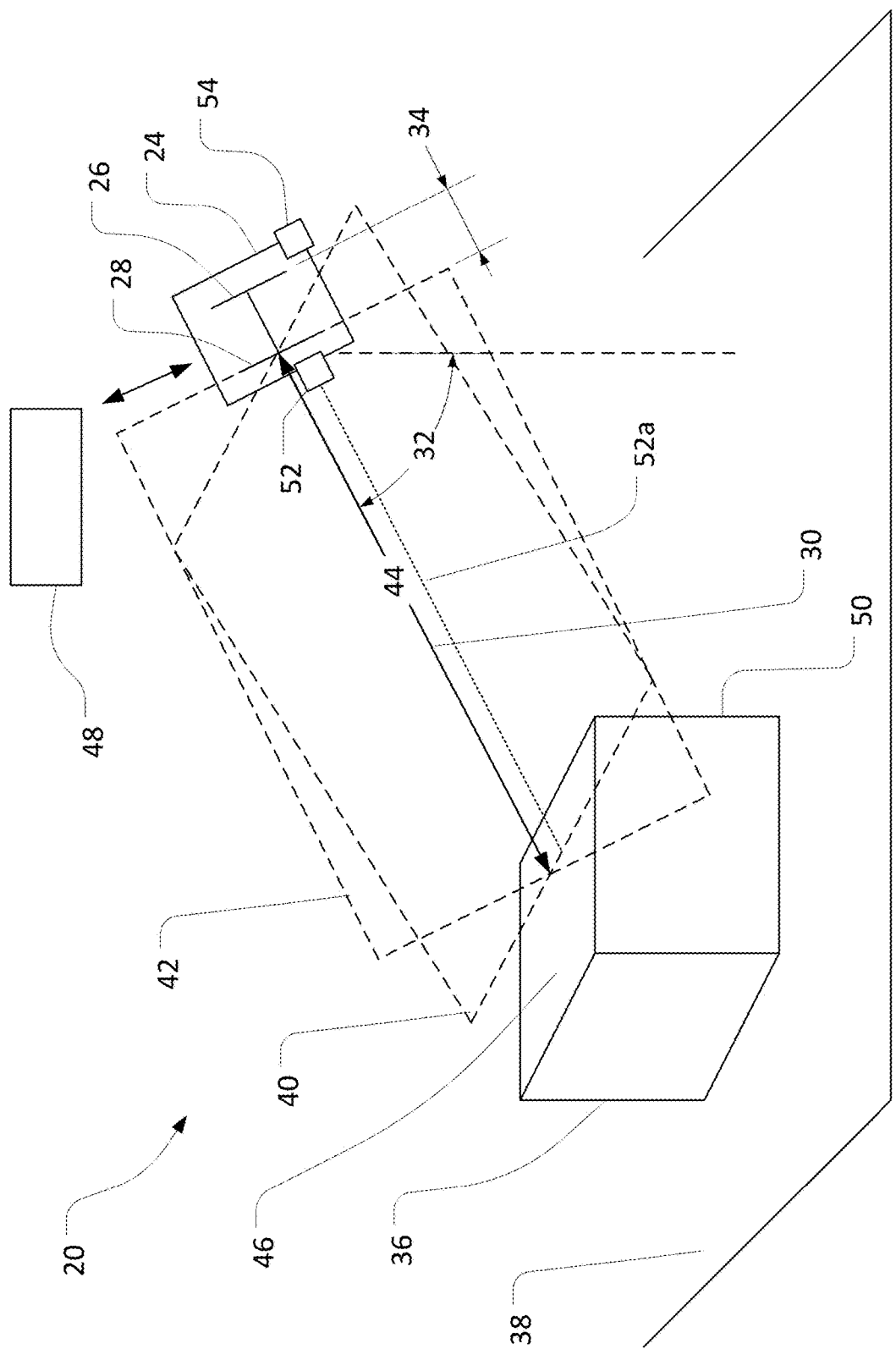
FIGS. 1 through 4 are schematic views of a dimensioning system executing dimensioning operations, according to embodiments of the invention.

In the following detailed description, reference is made to the accompanying drawings that form a part hereof. In the drawings, similar symbols typically identify similar components, unless context dictates otherwise. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGS., can be arranged, substituted, combined, separated, and designed in a wide variety of different configurations, all of which are explicitly contemplated herein.

In some implementations, aspects of the invention, including computerized implementations of methods according to the invention, can be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Embodiments of the invention can be implemented as systems and/or methods, including computer-implemented methods. Some embodiments of the invention can include (or utilize) a device such as an automation device, a special purpose or general purpose computer including various computer hardware, software, firmware, and so on, consistent with the discussion below.

As used herein, unless otherwise specified or limited, the terms "component," "system," "module," and the like are intended to refer to a computer-related system that includes hardware, software, a combination of hardware and software, or software in execution. For example, a component may be, but is not limited to being, a processor, a process running on a processor, an object, an executable, a thread of execution, a program, and/or a computer. By way of illustration, both an application running on a computer and the computer can be a component. One or more components (or system, module, and so on) may reside within a process and/or thread of execution, may be localized on one computer, distributed between two or more computers or processors, and/or included within another component (or system, module, and so on).

Also as used herein, unless otherwise specified or limited, the term "accelerometer" includes a device configured to measure an angular orientation of a body, including, for example, linear accelerometers of any number of measurement axes and gyroscopes of any number of measurement axes.

Certain operations of methods according to the invention, or of systems executing those methods, are represented schematically in the FIGS. Unless otherwise specified or limited, representation in the FIGS. of particular operations in particular spatial order is not intended to require those operations to be executed in a particular order. Certain operations represented in the FIGS., or otherwise disclosed herein, can be executed in different orders, as appropriate for particular embodiments of the invention. Further, in some embodiments, certain operations can be executed in parallel, including by dedicated parallel processors, or separate computing devices configured to interoperate as part of a large system.

As also discussed above, it may be useful to determine the dimensions of objects. For example, it may be useful to determine the height, width, and depth of parallelepiped, cylindrical, or other packages in order to optimize packing and shipping operations. But packages used within a facility may not conform to uniform dimensions, whether by design or due to incidents (e.g., impacts) during prior processing and transport. Accordingly, it may be difficult to reliably identify relevant dimensions of a particular package (or other object) with high reliability.

Some prior art systems utilize patterned light in order to determine object dimensions. For example, images can be acquired of a grid of laser light as projected onto an object. The images can then be analyzed to identify deviations in the grid (e.g., bends in the imaged laser lines) and thereby identify object dimensions. But this may require installation, calibration, and maintenance of relatively complex systems, may be limited to particular object types or geometries, and may require relatively close control of lighting conditions and relatively complex computational analysis.

Other prior art systems utilize one or more cameras configured to capture multiple images of an object from different perspectives. The resulting images can then be analyzed comparatively to attempt to identify object dimensions. But the use of multiple cameras may significantly complicate system installation and maintenance. Also, detailed calibration may be required, and, as above, relatively close control of lighting conditions and relatively complex computational analysis may be needed. Further, multiple-camera systems may not be particularly suited to portable operations.

Embodiments of the invention can help to determine dimensions of objects in an improved manner, as compared to some prior art system, with corresponding improvements to operation of dimensioning systems. For example, some embodiments of the invention can include systems that are designed to identify dimensions of objects based on a single grayscale image, taken by a single camera, without extensive calibration or complex lighting control. As another example, some embodiments of the invention can identify dimensions of objects without the use of patterned light, such as laser grids, and without requiring highly detailed image focus, and can do so rapidly, without requiring particularly complex computational analysis.

Usefully, some embodiments of the invention can be configured for highly portable operation, including through the use of mobile telephones or other handheld devices. In some embodiments, existing devices or other architecture of a mobile (or other) device can be used in order to configure the device for dimensioning operations without necessarily requiring significant (or any) hardware or structural changes. For example, as detailed below, it may be possible to adapt existing aimers of mobile devices for use in dimensioning operations.

In some embodiments of the invention, a dimensioning system can include an imaging system that is configured to capture an image of an object. The system can be configured to determine a select set of parameters of the imaging system and the associated surroundings, such as a distance between an imaging sensor and a lens, a distance between the lens and the object, a pixel size of the imaging sensor, and an angular orientation of the imaging sensor (e.g., relative to a reference frame shared with the object).

In some embodiments, the system can also be configured to identify multiple points of the object within the image of the object, such as points along the object that lie within perpendicular optical planes (e.g., as defined by the imaging system). For example, known machine vision algorithms can be implemented to identify edges, corners, or other features of an object within sagittal and tangential planes defined by an imaging system, or user input can be received to do the same. The system can then identify and solve linear trigonometric relationships among the determine parameters and the identified features of the object in order to determine dimensions of the object.

In some embodiments of the invention, as also noted above, a mobile device, such as a mobile telephone, can be configured to execute dimensioning operations, including operations similar to those described above. For example, an accelerometer within the mobile device can be used to determine an angular orientation of the mobile device. Further, an associated range finder or other device, such as a laser range finder or an off-axis (or other) aimer included within a case or other housing for the mobile device, can be used to determine a distance to an object that is being imaged by the mobile device. Onboard (or other) processing devices can then identify features of the object within the image, then identify and solve corresponding trigonometric relationships in order to determine dimensions of the object.

FIG. 1 illustrates an example dimensioning system 20 according to an embodiment of the invention, in use to determine dimensions of an object 36. In the implementation illustrated, the object 36 is configured as a parallelepiped package with squared corners and edges (i.e., a generally rectangular prism shape). In other implementations, the dimensioning system 20 (or other embodiments of the invention) can be used to determine the dimensions of other types of objects, such as cylinders, pyramidal shapes, spherical shapes, and so on.

Although the object 36 is illustrated as stationary, in some implementations, the dimensioning system 20 (or other embodiments of the invention) can be used to determine the dimensions of moving objects. In some cases, this may be particularly feasible, as compared to prior art systems, due to the ability of the system 20 to determine object dimensions based on a single image and without necessarily requiring a particular location or orientation of the object. In some implementations, for example, an object on a parallel surface can be readily dimensioned regardless of the orientation of the object on the surface.

Generally, a dimensioning system according to the invention includes an imaging system with determined or controllable imaging parameters. In the embodiment illustrated in FIG. 1, for example, the dimensioning system 20 includes an imaging system 24 with an optical arrangement that includes an imaging sensor 26, and a lens arrangement with a lens 28. Correspondingly, the imaging system 24 defines imaging parameters that include: an angular orientation of an optical axis 30, such as specified by an angle 32 relative to a gravitational reference frame; a distance 34 along the optical axis 30 between the imaging sensor 26 and the lens 28; a field of view ("FOV") that can include an object 36 on a flat support surface 38; and a pixel size of the imaging sensor 26. The imaging system 24 also defines a sagittal imaging plane 40 and a tangential imaging plane 42, coincident on the optical axis 30, and a distance 44 between the lens 28 and the object 36 along the optical axis 30.

In particular implementations, the angle 32 relative to gravity may be equivalent to an angle of the optical axis relative to a normal line extending from a particular facet of an object. For example, with the object 36 configured as a parallelepiped and the support surface 38 configured as flat and horizontal, the angle of the optical axis 30 relative to the support surface 38 may be the same as the angle of the optical axis 30 relative to a top horizontal facet 46 of the object 36.

In other implementations, an orientation or geometry of an object or a support surface may alter this correspondence. Accordingly, in some embodiments, a mathematical transform may be required to convert an angle of the optical axis relative to gravity (or another reference frame) to an angle relative to a reference frame of the object. In some embodiments, this transform may be based upon further analysis of the relevant object, such as machine vision analysis implemented by a machine vision system 48 to identify a particular aspect of the object.

In some embodiments, the machine vision system 48 can be included in the imaging system 24. In some embodiments, the machine vision system 48 can be remotely disposed and in electronic communication with the imaging system 24. In some embodiments, a processor device (not shown) for other operations described herein can be included in the imaging system 24, in the machine vision system 48, or in another system that is generally in communication with dimensioning system 20.

In the implementation illustrated in FIG. 1, the FOV of the imaging system 24 is oriented so that an image of the object 36, captured by the imaging sensor 26, includes the top facet 46 and a front facet 50 of the object 36 as intercepted by the sagittal and tangential imaging planes 40, 42. As detailed below, this may be useful in order to determine dimensions of the object 36 efficiently and accurately.

In some embodiments, imaging parameters, such as those discussed above, may be predetermined and relatively unchangeable. For example, in installations in which the imaging system 24 is a fixed-mount imaging system, the location and angular orientation of the imaging system 24 may be relatively permanent, and therefore may not change during relevant operations.

In some embodiments, certain imaging parameters may be changeable. For example, some fixed-mount imaging systems may be adjustable in certain aspects. Similarly, as also discussed below, some imaging systems can be configured as mobile systems that may be subjected to changes in location and orientation during normal operation. Correspondingly, for example, values of the angle 32 and the distance 44 may sometimes change. Similarly, in cases where the object 36 moves relatively to the imaging system 24, at least the distance 44 may change over time.

In implementations in which the distance 44 between the lens 28 and the object 36 may be predetermined, the distance 44 may, for example, be retrieved from a look-up table or other repository. In some implementations, however, it may be appropriate to measure the distance 44 for a particular image acquired by the imaging system 24. To this end, it may be useful to include a distance sensor within the dimensioning system 20. In different embodiments, different types of distance sensors can be used, such as laser range finders, time of flight sensors, laser displacement or stereo displacement systems, and so on.

In some embodiments, a laser range finder may be optimally employed. For example, as compared to other known systems, laser range finders may be relatively inexpensive, durable, and reliable, and the expected accuracy may be appropriate for the purposes described herein. Further, although laser range finders may sometimes be configured to determine a distance only at a particular point (or relatively small area) on an object, this may not necessarily limit the utility of the measurement for many embodiments of the invention due to the nature of the dimensioning operations disclosed herein.

In the embodiment illustrated in FIG. 1, a laser range finder 52 is mounted to the imaging system 24, so that the laser range finder 52 can generally determine a distance between the imaging system 24 and the object 36. In some embodiments, the laser range finder 52 may not necessarily measure the distance 44 directly, due, for example, to the placement of the laser range finder 52 relative to the other components of the imaging system 24. But, in such a case, it may be relatively trivial to derive the distance 44 from the measured distance, based on predetermined relative spacings of the laser range finder 52 and the lens 28 (or other components of the imaging system 24). Correspondingly, the laser range finder 52 can be mounted at other locations on the imaging system 24 without significant detriment to performance.

In some implementations, it may be useful to orient a beam 52*a* of the laser range finder 52 to travel in parallel with the optical axis 30, or along the sagittal imaging plane 40 (as shown) or the tangential imaging plane 42. In this way, for example, the distance 44 can be relatively directly measured via operation of the laser range finder 52 and thereafter utilized to dimension the object 36 (e.g., as described below).

Other implementations may be possible, however. For example, in some cases a beam of a laser range finder, or similar other range-finding mechanism, may be configured to intersect an object separately from a relevant sagittal or tangential plane of the associated imaging system, or to travel obliquely to one or both of those planes. In such cases, the value of a relevant distance (e.g., the distance 44) may still be derived with relatively low-cost computational efforts. For example, in some such cases, the distance can be derived based upon a predetermined angular orientation of the relevant range finding device (e.g., an angle of a laser range finder relative to an optical axis) or other factors.

In some implementations, the incidence of a beam of a laser range finder (or other similar device) on an object can be identified within an image of the object in order to inform appropriate adjustment of the distance by the range finder and thereby to appropriately determine a distance to the object to use during object dimensioning. In some such implementations, known trigonometric principles can be applied with relatively little computational expense, in order to provide an appropriate distance between an object and a lens of an imaging system. In some implementations, a look-up table or relevant trigonometric equations can be stored in an imaging system (or elsewhere) to assist in identifying an expected incidence on an object of the beam of a laser range finder, depending on the distance between the imaging system 24 and the object or other factors.

Similarly to the distance 44, in some implementations the angle 32 of the optical axis 30 may be predetermined and may, for example, be retrieved from a look-up table or other repository. For example, where the imaging system 24 is a fixed-mount imaging system, the physical support structures and mounting apparatus that support the imaging system 24 may relatively fixedly determine the angle 32 relative to a particular reference frame (e.g., as based on gravity or the support surface 38).

In some implementations, however, it may be appropriate to measure the angle 32. For example, an accelerometer, such as a three-axis linear accelerometer 54, can be associated with the imaging system 24, in order to measure the orientation of the imaging system 24 and thereby, directly or indirectly, to measure the value of the angle 32. For example, where the imaging system 24 is configured as part of a mobile telephone, an embedded accelerometer can be employed. In other embodiments, other devices can be similarly used, such as three-axis gyroscopes, or other angular measurement devices.

With the dimensioning system 20 constituted as described (or otherwise constituted according to other embodiments), dimensions of various objects can then be calculated with relatively high efficiency and accuracy. For example, as also described below, an image of the object 36 can be acquired using the imaging sensor 26 and one or more features of the object 36, such as points along the facets 46, 50, can be identified within the image. Dimensions of the object 36 can then be determined from the image, using imaging parameters of the imaging system 24, such as those described above. For example, as also described below, a trigonometric relationship can be identified and then solved based upon known aspects of the imaging system 24 in combination with at least the object-lens distance 44, the optical-axis angle 32, and the identified object features.

Figure 2:
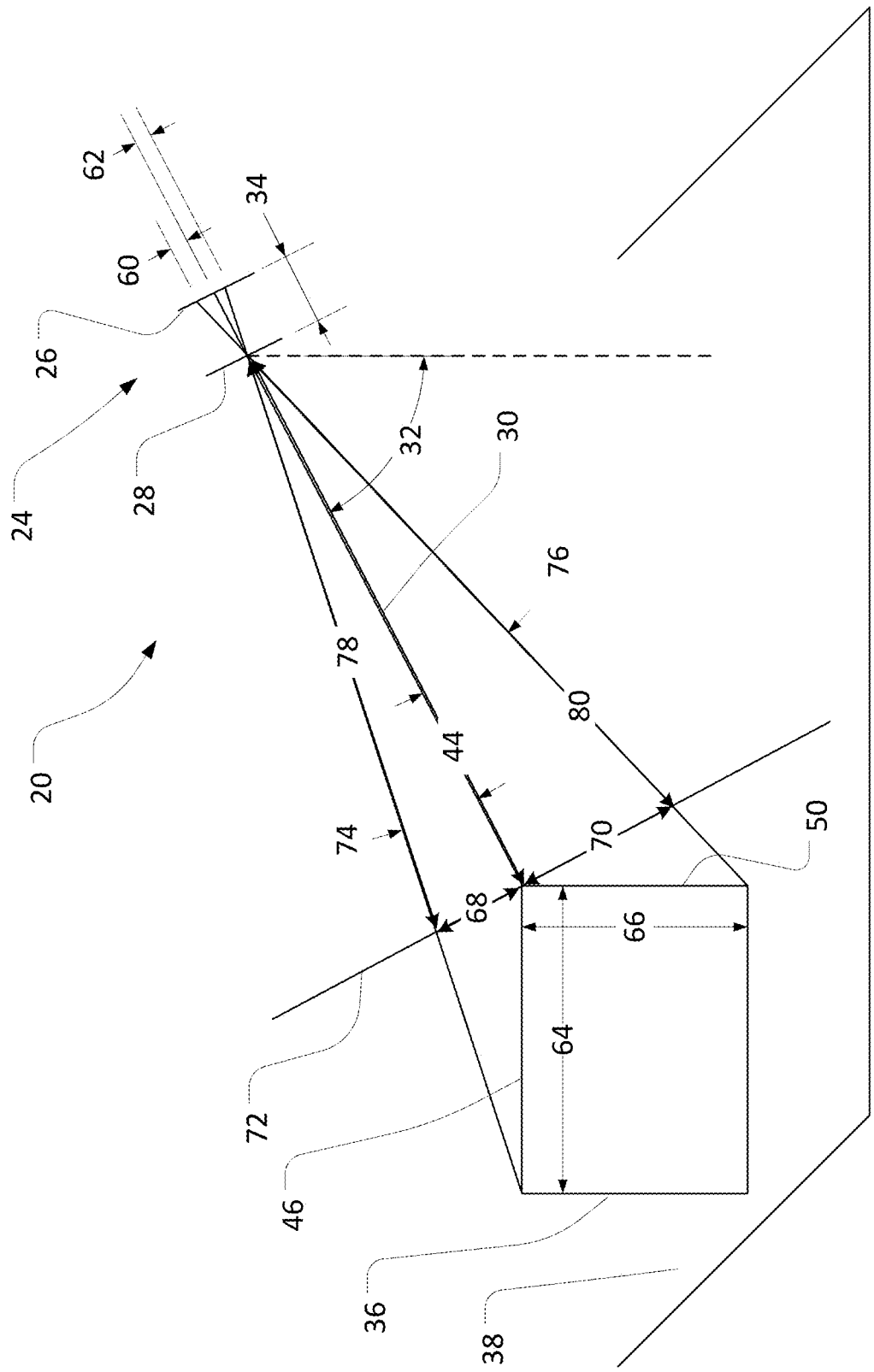

An example implementation of these principles is illustrated in a simplified schematic in FIG. 2. As illustrated in FIG. 2, an image of the object 36 has been captured using the imaging system 24, with the representation of the object 36 within the image resulting from light incident over a combination of distances 60, 62 on the imaging sensor 26. In the particular implementation illustrated, for example, the image includes a representation of a full depth 64 of the top facet 46 and a representation of a full height 66 of the front facet 50, which can be viewed as being virtually projected as distances 68, 70, respectively, on a virtual object plane 72. Further, the front and rear edges of the facet 46 and top and bottom edges of the facet 50 have been identified within the image (e.g., as described below), so that virtual light paths between these edges and the imaging sensor 26 can be identified (as illustrated in FIG. 2).

As also discussed above, the value of the angle 32, the distance 44, and the distance 34 may be known or may be readily determined, as may a correspondence between a pixel of an image and an associated distance along the imaging sensor 26. Accordingly, using known trigonometric relationships, relatively low-cost computer calculations can be implemented to determine the actual value of the depth and height 64, 66 of the object 36. In some implementations, for example, pixel counts corresponding to the distances 60, 62 can be determined. Then the values of the distances 68, 70, angles 74, 76, and distances 68, 70 can also be determined, based on the distances 60, 62, the distances 34, 44, and the angle 32. In this way, for example, dimensions of triangles including the depth and height 64, 66 of the object 36 can be fully specified, so that the values of the depth and height 64, 66 can be fully determined.

Figure 3:
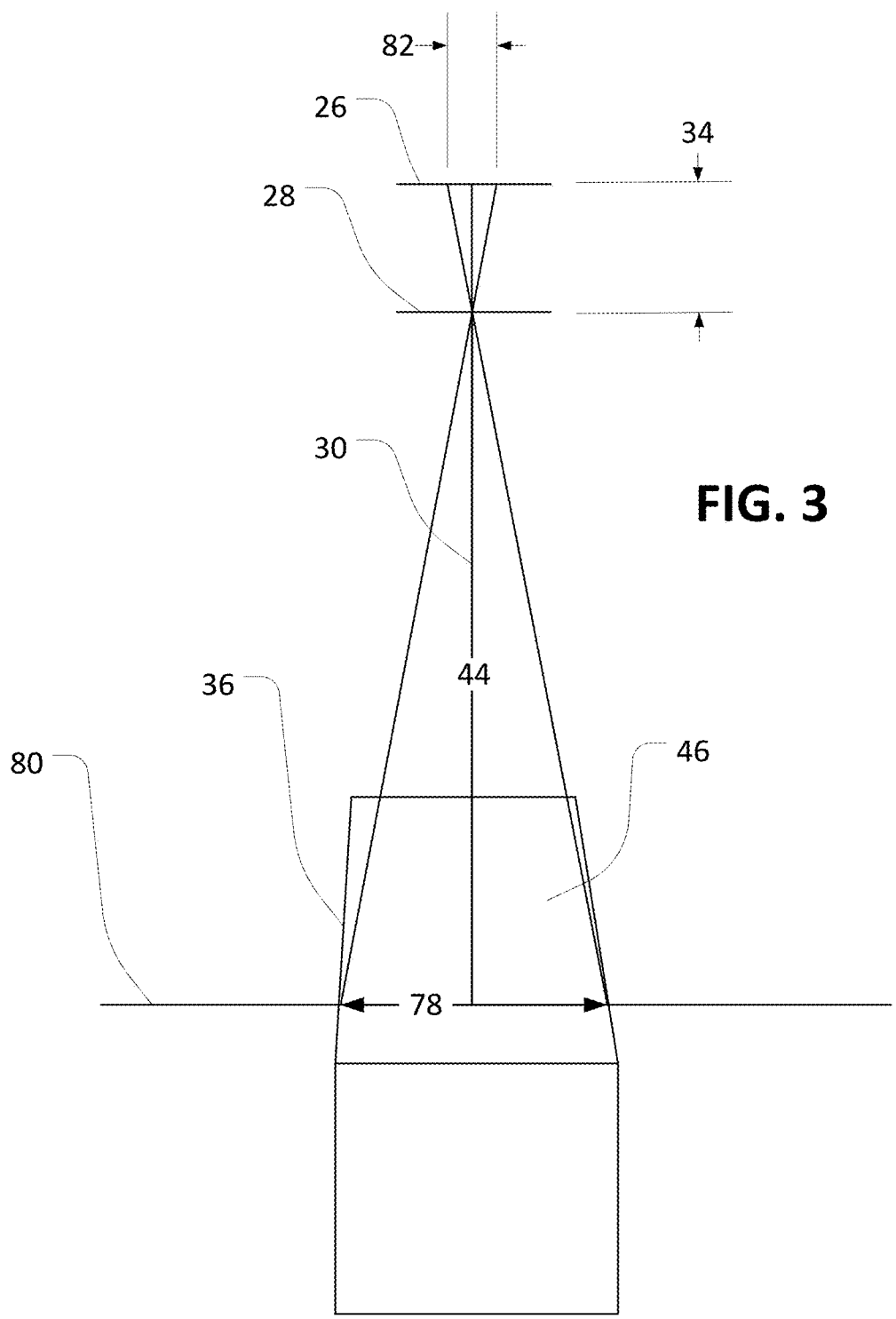

As illustrated in FIG. 3, similar operations to those described above can also be implemented in order to determine a width 78 of the facet 46 of the object 36 at a line segment 80 representing the intersection of the sagittal imaging plane 40 (see, e.g., FIG. 1) with the object 36. For example, a width 82 on the imaging sensor 26 that receives light rays from the width 78 of the facet 46 can be derived from a pixel width of the facet 46 in the image, as similarly described above. Based on the known distances 34, 44, the value of the width 78 can then be readily determined by solving the associated trigonometric relationships.

Figure 4:
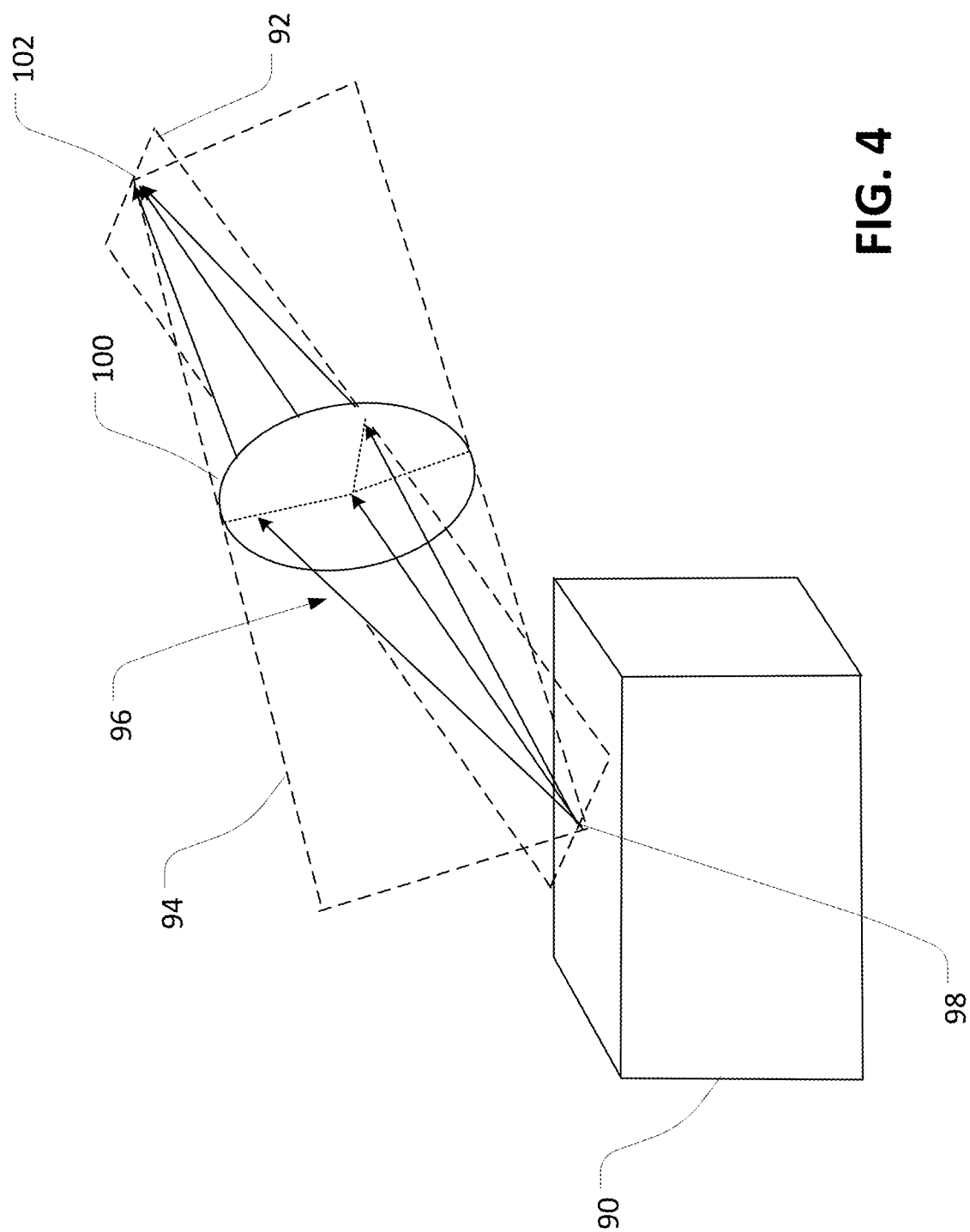

FIGS. 2 and 3 illustrate an example in which the object 36 is a parallelepiped that is oriented squarely relative to the imaging sensor 26. In some implementations, this configuration may not be possible. For example, as illustrated in the simplified schematic of FIG. 4, an object 90 may be imaged such that a sagittal imaging plane 92 and a tangential imaging plane 94 are somewhat skewed relative to the square dimensions of the object 90. However, as illustrated by light rays 96 from an object point 98 though a lens 100 to a corresponding image point 102, similar trigonometric relationships as those described above may still apply. Accordingly, similar determination of the dimensions of the object 90 can be executed, supplemented as appropriate with rotational transformations.

Due to the determinate nature of the trigonometric relationships, as illustrated, it may be possible to use the specified parameters and principles in a variety of ways to determine the value of the depth, height, and width 64, 66, 78, or the value of other dimensions of the object 36. Accordingly, the particular operations and orders of operations discussed above should be viewed as examples only. Those of skill in the art will readily recognize alternative approaches in view of the discussion herein to determine dimensions of an object based upon the disclosed principles.

Generally, it may be useful to identify multiple points on multiple facets of an object, particularly adjacent facets, to appropriately determine dimensions of the object in accordance with the principles disclosed herein. In the implementation illustrated in FIGS. 2 and 3, for example, the points of the object 36 that were identified within the acquired image to assist in determining the values of the depth and height 64, 66 correspond to line segments along opposing edges of the facets 46, 50. Further, a subset of points used to determine each the depth and height 64, 66 overlap along the shared edge of the facets 46, 50. In other implementations, non-edge and non-overlapping points can be selected. Similarly, in some cases points along non-opposing line segments or edges, or points not on adjacent facets, can be selected As also noted above, in different implementations, features of an object within an image can be identified in different ways. In some embodiments, a machine vision system can be used, such as the system 48 illustrated in FIG. 1. For example, known machine vision algorithms can be used to identify an intensity edge or an intensity corner of an image in order to identify a corresponding edge, corner, facet, or other feature of an object to be dimensioned. Dimensioning of the object can then proceed, for example, similarly to the approach detailed with regard to FIGS. 2 and 3.

In some implementations, to appropriately dimension an object, a machine vision system, such as the system 48, can be used to identify multiple features on an object, such as at least three edges or at least one edge and two corners. In this regard, for example, a machine vision system can be used to detect at least three intensity edges, or one intensity edge and two intensity corners, respectively, within the relevant image.

In some embodiments, a dimensioning system can be configured to receive user input in order to identify object features within an image. For example, a user interface can be configured to receive input from a user that directly identifies an edge, corner, facet or other feature within an image, to assist in determining dimensions of a corresponding object.

Figure 5:
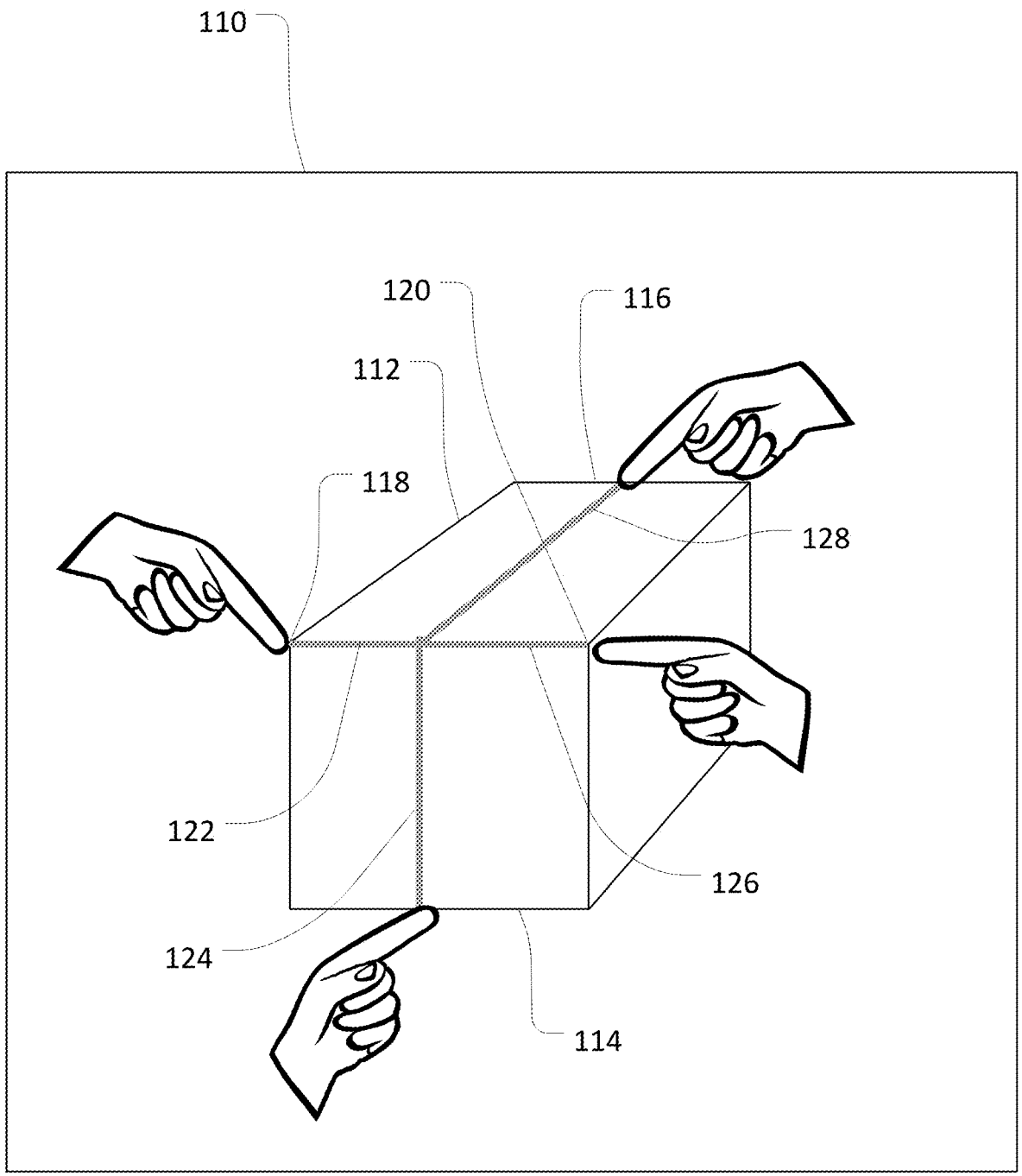
FIG. 5 is a view of a user interface for dimensioning, according to an embodiment of the invention.

In some embodiments, a dimensioning system can include a touchscreen or other similar input device to receive tactile (or other) input from a user, in order to identify particular features of an object within an image of the object. As illustrated in FIG. 5, for example, an example dimensioning system can include a touchscreen 110 that is configured to display an image of an object 112 and to receive tactile input from a user. In the implementation illustrated, a user has touched the touchscreen 110 at a set of four points that correspond to two edges 114, 116 that lie at opposite ends of adjacent facets of the object 112, and two corners 118, 120 of an edge 122 that lies at a junction between the adjacent facets. In this way, for example, user input can appropriately specify a sufficient number of features in the image of the object 112 so that values of a height 124, width 126, and depth 128 of the object 112 can be determined.

Tactile-input (or other similar) implementations may be particularly useful with mobile systems, and can support dimensioning operations with errors of less than 5%. It may also be possible, however, to effect similar implementations in fixed-location systems with appropriate input interfaces.

In other embodiments, other approaches can be used to appropriately identify object features in an image. For example, in some embodiments, a dimensioning system can utilize machine learning algorithms (or resulting look-up tables) to identify features on objects, including edges, corners, or facets of parallelepiped boxes.

In some embodiments, as part of dimensioning operations, known machine vision tools for identifying lines can be used. For example, a Hough transform or other machine vision algorithm can be employed in order to identify line candidates. In some embodiments, further refinement may then be necessary in order to distinguish likely edges of an object from irrelevant line candidates, such as may result from support structures, creases or markings on an object, lighting irregularities, and so on. Again, a variety of machine vision algorithms or other approaches can be used in this regard.

Figure 6:
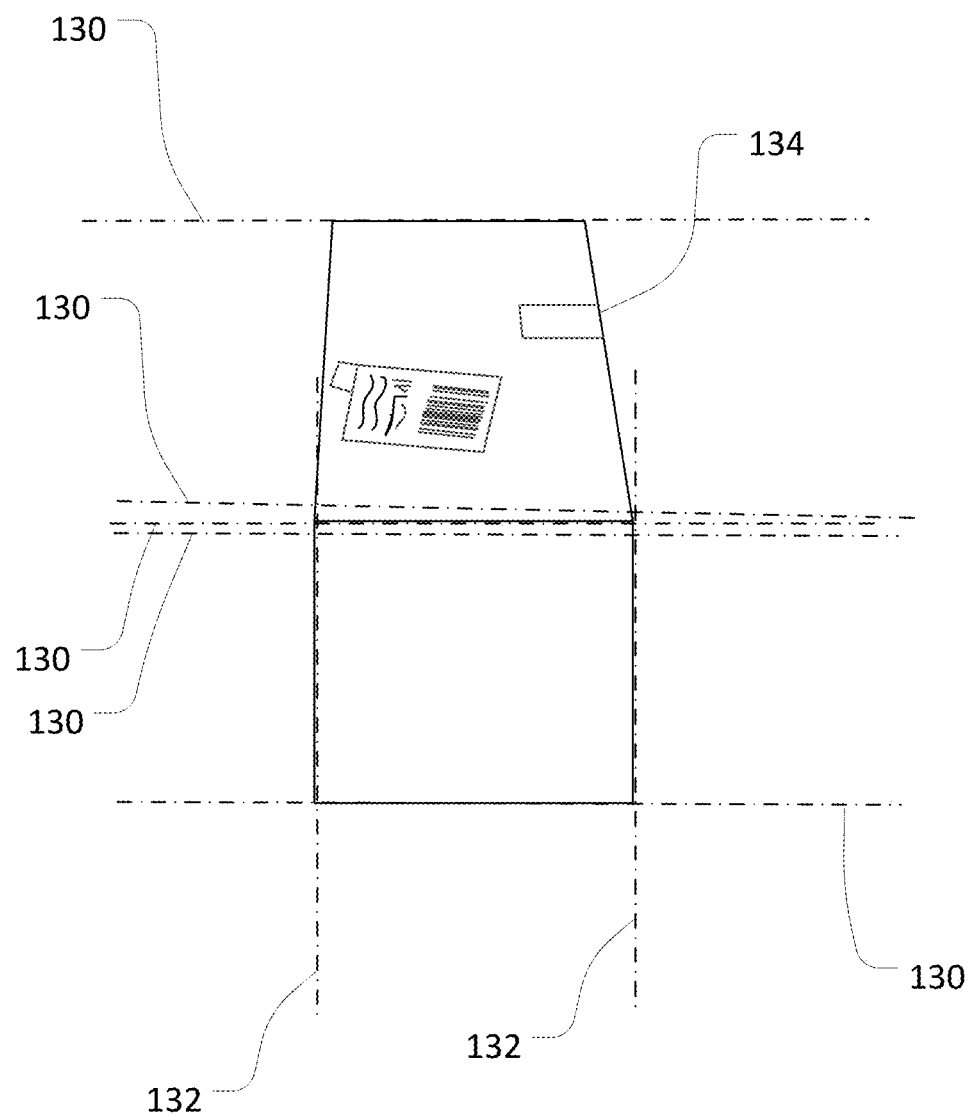
FIG. 6 is a schematic view of an aspect of dimensioning operations on a parallelepiped according to an embodiment of the invention.

In some embodiments, a user input, a calibration setting, or another factor can be used to determine an expected angle of a line, and candidate lines in an image, such as lines that may represent object edges, can be identified accordingly. For example, based on the expected geometry of an object and a known (e.g., measured) orientation of an imaging device, the relative expected angle in an image of vertical and horizontal edges of the object can be determined. A search for line candidates in the image can then be constrained accordingly. For example, as illustrated in FIG. 6, sets of candidate horizontal lines 130 and candidate vertical lines 132 can be identified for a particular object 134 based on the expected angular orientation of the edges of the object 134. Further refinement, such as through the use of further machine vision algorithms or user input (see, e.g., FIG. 5) can then be used to select particular subsets of the candidate lines 130, 132 for further dimensioning analysis (e.g., as described relative to FIGS. 2 through 4).

As another example, candidate horizontal lines can be identified based upon an expected orientation of an object within an image. For example, in some cases the upper line 130 in FIG. 6 can be identified based on pre-determining that an upper-most line (or lines) in an image is likely to correspond to a top, far edge of the object 134. Likewise, the lower line 130 in FIG. 6 can be identified based on pre-determining that a lower-most line (or lines) in an image is likely to correspond to a bottom, near edge of the object.

Similarly, in some embodiments, candidate lines can be identified based upon an expectation that an aimer for imaging (e.g., as described relative to FIG. 8, below) may be aimed at a particular portion of an object. For example, based upon an expectation that a laser aimer (see, e.g., FIG. 8) is aimed at a top, front edge of a parallelepiped, a system can be configured to identify, as a candidate for a top, front edge, particular lines in an image that are relatively close to an identified location of an aimer pattern.

In some embodiments, detailed orientation information for an imaging device can be used to identify or refine sets of line candidates in an image. For example, a mobile imaging device (e.g., as described relative to FIGS. 7 and 8, below) can be equipped with an accelerometer that can provide three-axis (or other) orientation information. Accordingly, for example, it may be possible to determine an angle of an optical axis (e.g., similar to the angle 32 of FIGS. 1 and 2), which may be characterized as a "pitch" of the relevant system. Further, it may also be possible to determine a corresponding "yaw" and "roll" of the imaging device. In some cases, for example, this additional information regarding orientation can be used to refine analysis of an image to identify or refine line candidates. For example, the yaw and roll of an imaging system may be used to identify likely orientation of horizontal and vertical (or other) edges of an object in an acquired image.

In some embodiments, line candidates can be considered in combination with each other in order to identify likely edges or other features of an object. For example, the general geometric patterns of an object can be determined, such as the expected number and relative orientation of edges of a parallelepiped. Sets of candidate lines can then be analyzed in order to emphasize sets of lines that correspond to that number and relative orientation or to reject sets of lines that do not.

Figure 7:
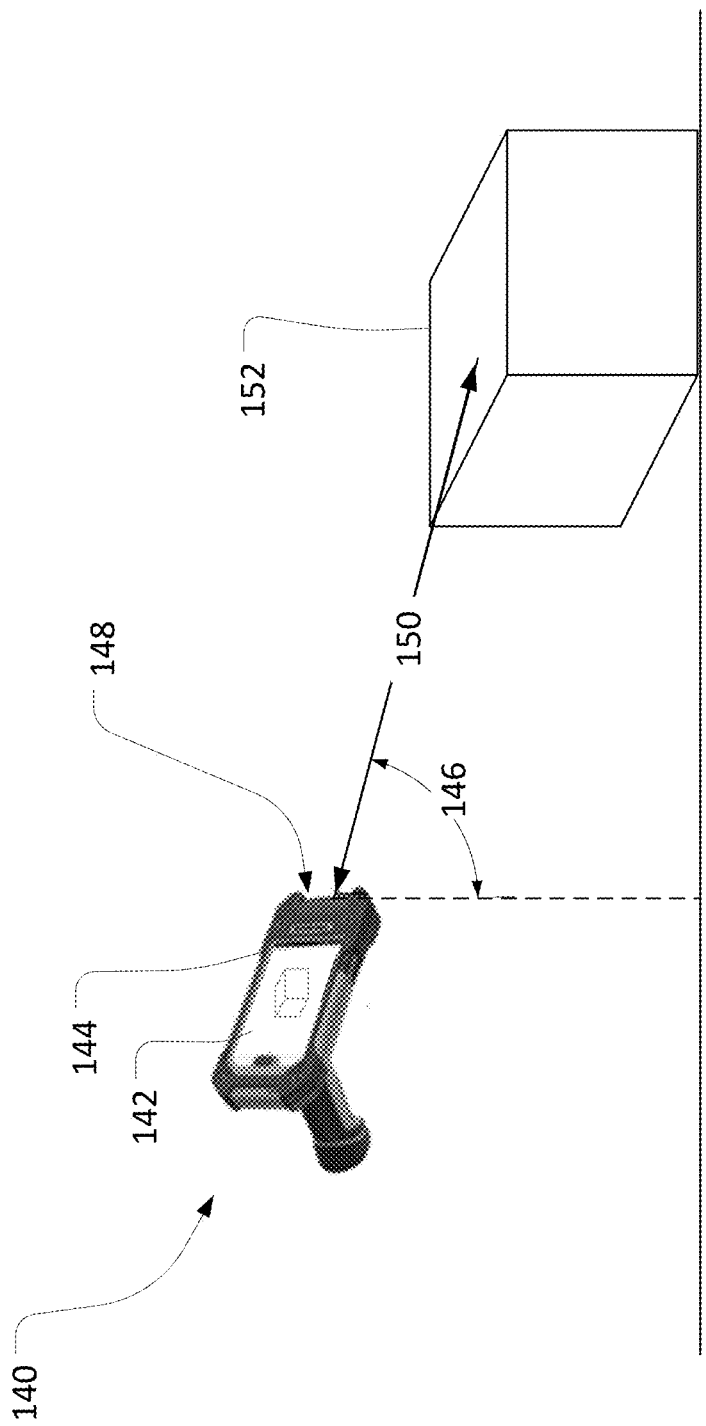
FIG. 7 is a schematic view of another dimensioning system executing dimensioning operations, according to an embodiment of the invention.

As noted above, some embodiments of the invention can be configured as portable systems. For example, FIG. 7 illustrates a mobile dimensioning system 140 that includes a mobile device 142 (e.g., a smartphone) that is supported in a portable pistol-grip housing 144. The mobile device 142 generally includes an imaging sensor, a lens arrangement, and an angular sensor (e.g., a three-axis accelerometer) configured to measure an angle 146 of the mobile device 142 relative to gravity (or another reference frame). Further, the housing 144 also supports a range finder 148 (e.g., a laser range finder) that exhibits a predetermined orientation relative to the imaging sensor of the mobile device 142 and is configured to measure a distance 150 between the mobile device 142 and an object 152 to be imaged. Thus arranged, the mobile dimensioning system 140 can be used to determine dimensions using operations consistent with other discussion herein. For example, a touchscreen of the mobile device 142 can be used to identify features of the object 152 in an acquired image and then dimensions of the object 152 can be determined from the image using operations similar to those discussed with regard to FIGS. 2 through 4.

Figure 8:
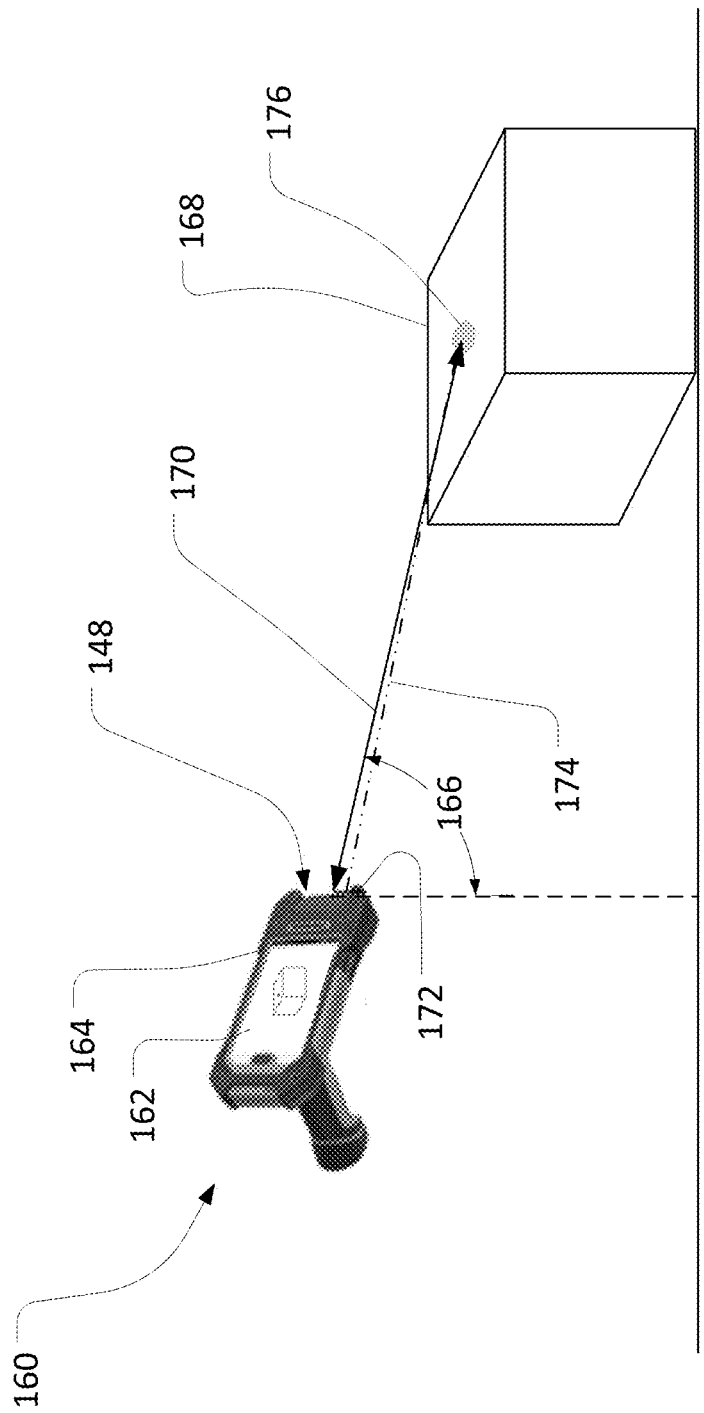
FIG. 8 is schematic view of a mobile dimensioning system with an aimer executing dimensioning operations, according to an embodiment of the invention.

As another example, FIG. 8 illustrates a mobile dimensioning system 160. The mobile dimensioning system 160 is generally similar to the mobile dimensioning system 140 of FIG. 7 and, accordingly, includes a mobile device 162, such as a smartphone with a three-axis accelerometer, that is supported in a portable pistol-grip housing 164. Also similarly to the mobile dimensioning system 140, the mobile dimensioning system 160 can measure an angle 166 of the mobile device relative to gravity (or another reference frame) using the included accelerometer or other similar device. Likewise, based on the angle 166 and a determined distance 170 between the mobile device 162 and an object 168 to be measured, the mobile dimensioning system 140 can determine relevant dimensions of the object 168 (e.g., using operations as discussed in detail above).

Further, in the illustrate embodiment, the housing 164 supports an aimer 172 to assist in acquiring images of the object 168. In some embodiments of the invention, projected illumination from the aimer 172 can be used to determine the distance 170, in support of dimensioning operations. For example, in the illustrated embodiment, the aimer 172 is an off-axis spot aimer, which projects an aiming beam along a direction 174 to illuminate an aiming pattern, such as an aimer dot 176, on the object 168.

Usefully, the off-axis configuration of the aimer 172 causes the aiming beam to be projected obliquely (e.g., nearly, but not fully, parallel) relative to the optical axis of the imaging device of the system 160, such as may be represented in FIG. 8 by the line indicating the distance 170. As a result, the position of the aimer dot 176 on the object 168, relative to a center of an image of the object 168 acquired by the mobile device 162, may vary depending on the distance between the aimer 172 and the object 168.

With the noted arrangement, the position of the aimer dot 176 in an image of the object 168 can accordingly be used to determine the distance 170, in support of further dimensioning operations. In some embodiments, using an identified location of the aimer dot 176, calibrated tables or predetermined relationships between aimer-dot location and object distance can be used to determine the distance 170.

In some embodiments, to support calibration of these and similar approaches, a mathematical model can be derived to determine distance to an object based upon displacement of an aimer pattern in an image relative to a location of the aimer pattern in an image that was acquired with the object at a known length. For example, if the precise location of an optical center in an image (i.e., a point in the image corresponding to the optical axis) is known, the location of the aimer pattern can be determined with the object at three or more different calibration locations that exhibit known object-imaging distances. A relationship can then be determined between the distance to an object and the distance of the aimer pattern from the optical center of an image. As another example, if the precise location of an optical center is not known, a similar relationship can be determined based upon capture and analysis of calibration images with the object at four or more different locations that exhibit known object-imaging distances.

As still another example, some approaches to calibration can be used to create a relatively detailed look-up table that relates locations of aimer patterns in images to distances of the object from the aimer or an associated imaging system. For example, a plurality of images can be acquired of an aimer pattern on an object at a plurality of known distances from the imaging device. During run-time operations, the identified location of an aimer pattern in an image can then be compared to locations in the look-up table and an approximate distance to the object determined accordingly.

In some embodiments, to locate an aimer pattern in an image, a dimensioning system may be configured to execute particular types of image analysis. For example, the mobile device 162 of the mobile dimensioning system 160 can be configured to use (or call) a blob or other thresholding tool to identify an aimer pattern. In other embodiments, other configurations are possible.

In some embodiments, to streamline operations, a search area for an aimer pattern in an image can be constrained based on an expected behavior of the aimer pattern upon changes in the object-imaging distance. For example, in off-axis aimer arrangements, the aimer pattern may be expected to move (in associated images) along a generally straight line as the aimer (and imaging device) move towards or away from an object. Accordingly, in some implementations, a search routine to identify the aimer pattern can be constrained to a line or rectangle within an image.

In the example illustrated in FIG. 8, the aiming patter is configured as the aimer dot 176, which is generally circular (or, e.g., ovular, depending on the surface onto which it is projected). In other embodiments, other configurations are possible. For example, other patterns of aimer light can be used, with mobile dimensioning systems configured to identify particular (e.g., distinctive) features of the patterns in acquired images.

In some embodiments, a dimensioning system can be configured to determine dimensions of an object in other ways. For example, in some embodiments, a dimensioning system can be arranged with an optical axis that is perpendicular to a relevant surface and geometric relationships dependent on that perpendicular arrangement can be used to determine object dimensions.

Figure 9:
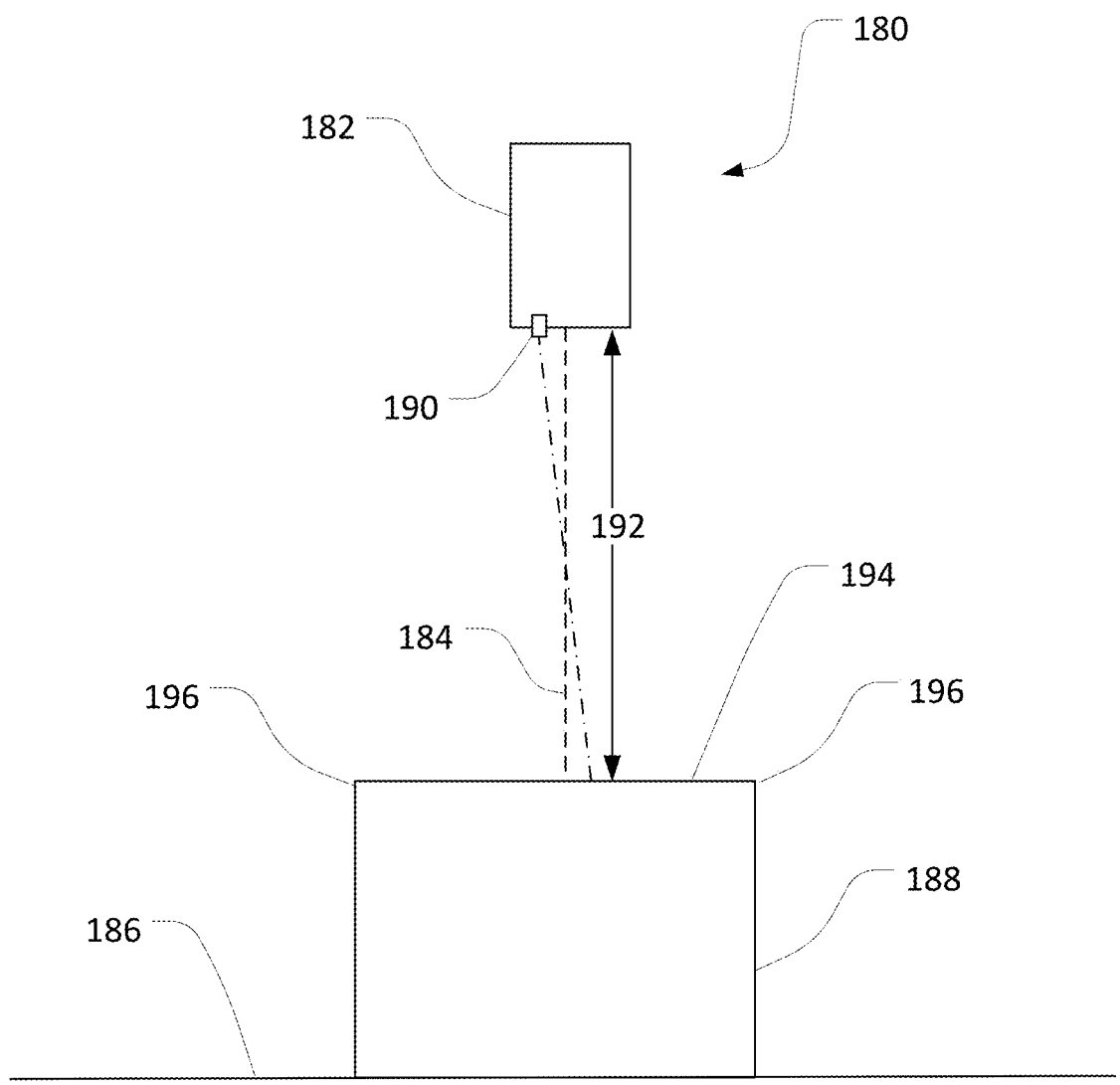
FIG. 9 is a schematic view of yet another dimensioning system executing dimensioning operations, according to an embodiment of the invention.

As one example, FIG. 9 illustrates a dimensioning system 180 that includes an imaging system 182 with an optical axis 184 that is substantially perpendicular to a support surface, such as a conveyor 186 configured to move the object 188. The imaging system 182 can be configured as a mobile system, such as a system similar to the mobile device 142 of FIG. 7, or as a fixed system, such as a system similar to the imaging system 24 of FIG. 1. Further, as with other imaging systems discussed herein, the imaging system 182 can include appropriate lens arrangements (not shown in FIG. 9), processing devices (not shown in FIG. 9), or communication links (not shown in FIG. 9).

In the embodiment illustrated in FIG. 9, the imaging system 182 is further configured for use with a range finder 190. Generally, the range finder 190 can be operated—alone or in conjunction with other systems—to determine a distance 192 between the imaging system 182 and the object 188, as the object 188 passes or is otherwise aligned with the optical axis 184. In some embodiments, the range finder 190 can be integrally included in the imaging system 182. In some embodiments, the range finder 190 can be a separate (e.g., removable) component.

Also in the embodiment illustrated in FIG. 9, the range finder 190 includes an off-axis aimer similar to the aimer 172 of FIG. 8. Accordingly, the distance 192 can be determined using operations similar to those described with respect to FIG. 8. For example, the distance 192 can be determined based upon locating an aiming pattern (not shown in FIG. 9) of the aimer 172 in an image of the object 188 that is acquired by the imaging system 182.

In other embodiments, other configurations are possible. For example, the range finder 190 can be configured as a laser range finder, a time of flight sensor, a laser displacement or stereo displacement system, and so on.

In addition to determining the distance 192, such as described above, the dimensioning system 180 can identify features of the object 188 in an image acquired by the imaging system 182. For example, features of a top surface of the object 188 (relative to the illustrated perspective of FIG. 9), such as an edge 194, corners 196, and so on, can be identified, as similarly described above, using machine vision operations, based upon user input, or in other ways.

With the determined perpendicular arrangement (as illustrated), a height of the object 188 above the conveyor 186 can then be calculated based on a difference between the distance 192 and a total distance between the imaging system 182 and the conveyor 186, with the total distance between the imaging system 182 and the conveyor 186 having been determined based upon manual input, prior or subsequent measurement using the ranger finder 190, or in other ways. Further, the dimensions (e.g., length and width) of the top surface of the object 188 can be determined using operations similar to those described above, as applied to the identified features of the object 188 in a relevant image and based upon the determined distance 192 and known properties of the imaging system 182. In this way, for example, a full set of dimensions for the object 188 can be determined based upon acquisition of a single image (or more) of the object 188 by the imaging system 182.

Figure 10:
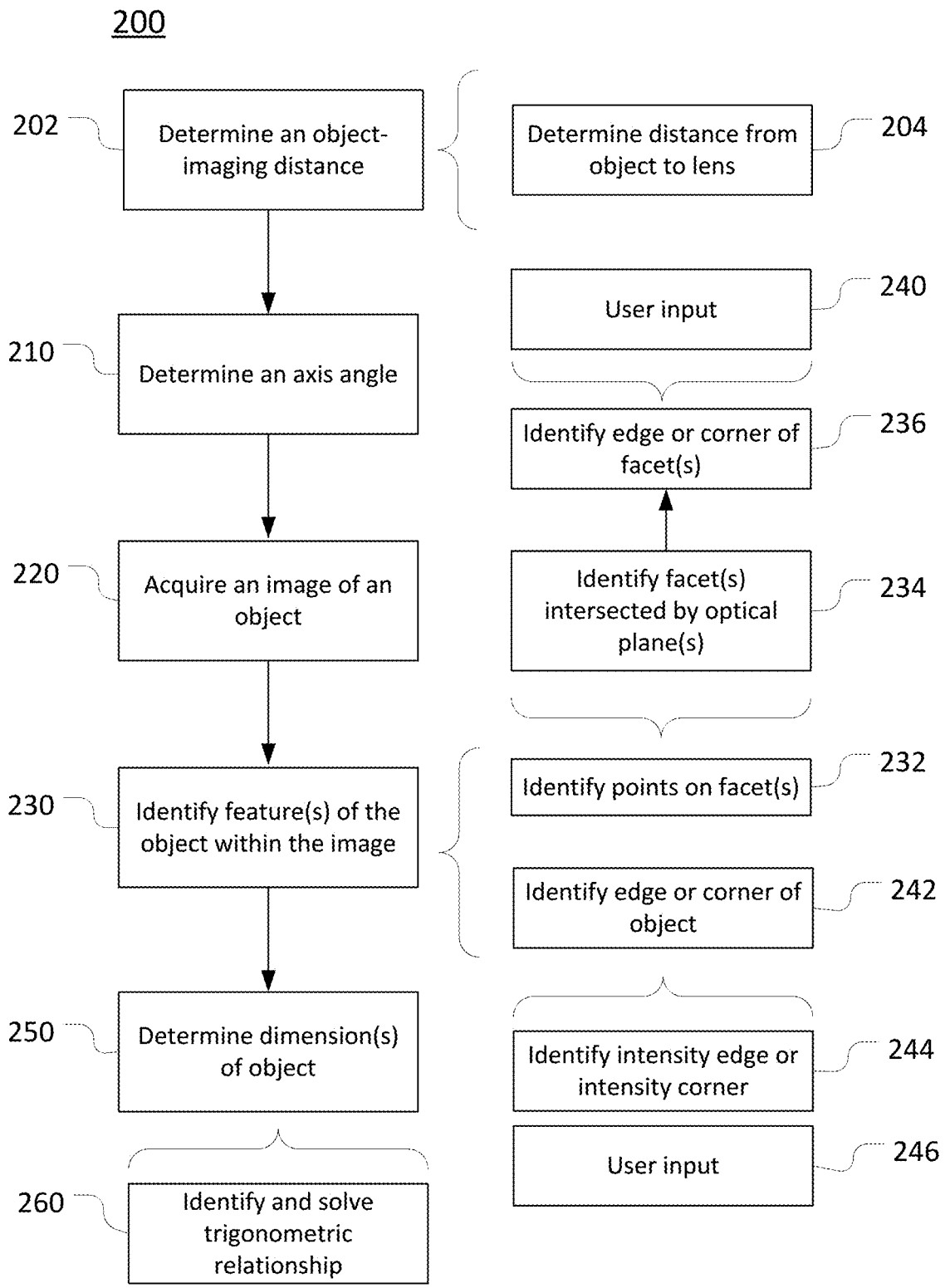
FIG. 10 is a diagrammatic view of a method of dimensioning an object, according to an embodiment of the invention.

Consistent with the discussion above, some embodiments of the invention can include computer-implemented methods, including methods executed by software or hardware modules of dimensioning or other (e.g., general machine-vision) systems. As one example, as illustrated in FIG. 10, an embodiment of the invention can include a method 200 for determining dimensions of an object. In some implementations, operations of the method 200 can be executed by the dimensioning systems 20, 180 of FIGS. 1 and 9 or the mobile dimensioning systems 140, 160 of FIGS. 7 and 8. In some implementations, other dimensioning systems can be used.

Among other operations, the method 200 includes determining 202 an object-imaging distance as a distance between an object to be imaged and a part of an imaging system. In some implementations, determining 202 the object-imaging distance may include directly determining a first and then deriving the object-imaging distance from the first distance. For example, using a laser range finder or other device, a distance can be determined 204 between the object and a housing of an imaging system, and then predetermined spatial aspects of the imaging system used to derive a distance between the object and a relevant lens (or other component).

The method 200 also includes determining 210 an axis angle as an angle of an optical axis of the imaging system relative to a particular reference. For example, using an accelerometer or a predetermined angular aspect of a fixed support structure, an angle of an optical axis relative to gravity or to a relevant support surface can be determined 210. In some implementations an axis angle may be determined 210 directly. In some implementations, an axis angle may be determined 210 indirectly. For example, a different angle may first be determined and then the axis angle derived therefrom.

The method 200 also includes acquiring 220 an image of the object using the imaging system. In different implementations, an image can be acquired 220 before, after, or simultaneously with the determination 202 of a relevant object-imaging distance and the determination 210 of a relevant axis angle.

The method 200 also includes identifying 230 one or more features of the object within the acquired image. In different implementations, as also discussed above, features can be identified 230 in different ways. For example, in some embodiments, multiple points can be identified 232 on facets of the object (within the image) based upon identifying 234 facets that are intersected by sagittal and tangential imaging planes and then identifying 236 edges, corners, or other features of those facets (e.g., opposing or shared edges or corners). In some implementations, user input 240, such as input received at a touchscreen can be used to identify 234 the facets or to identify 236 edges, corners, or other features thereof.

As another example, edges or corners of an object can be identified 242 based upon identifying 244 intensity edges or intensity corners within an image. For example, based upon user input 246 or machine vision algorithms, intensity edges or intensity corners can be identified 244 in a particular image and the locations of the intensity edges or intensity corners can be thereupon identified 242 as corresponding The method 200 also includes determining 250 one or more of the dimensions of the object. For example, according to principles described above, trigonometric relationships can be identified and then solved 260 based upon predetermined imaging parameters (e.g., sensor-lens distance), measured parameters (e.g., object-lens distance and axis angle), and various identified 230 features of the object. As also noted above, different approaches to identifying and solving 260 the trigonometric relationships are possible, including those specifically described with regard to FIGS. 2 through 4, above.

Figure 11:
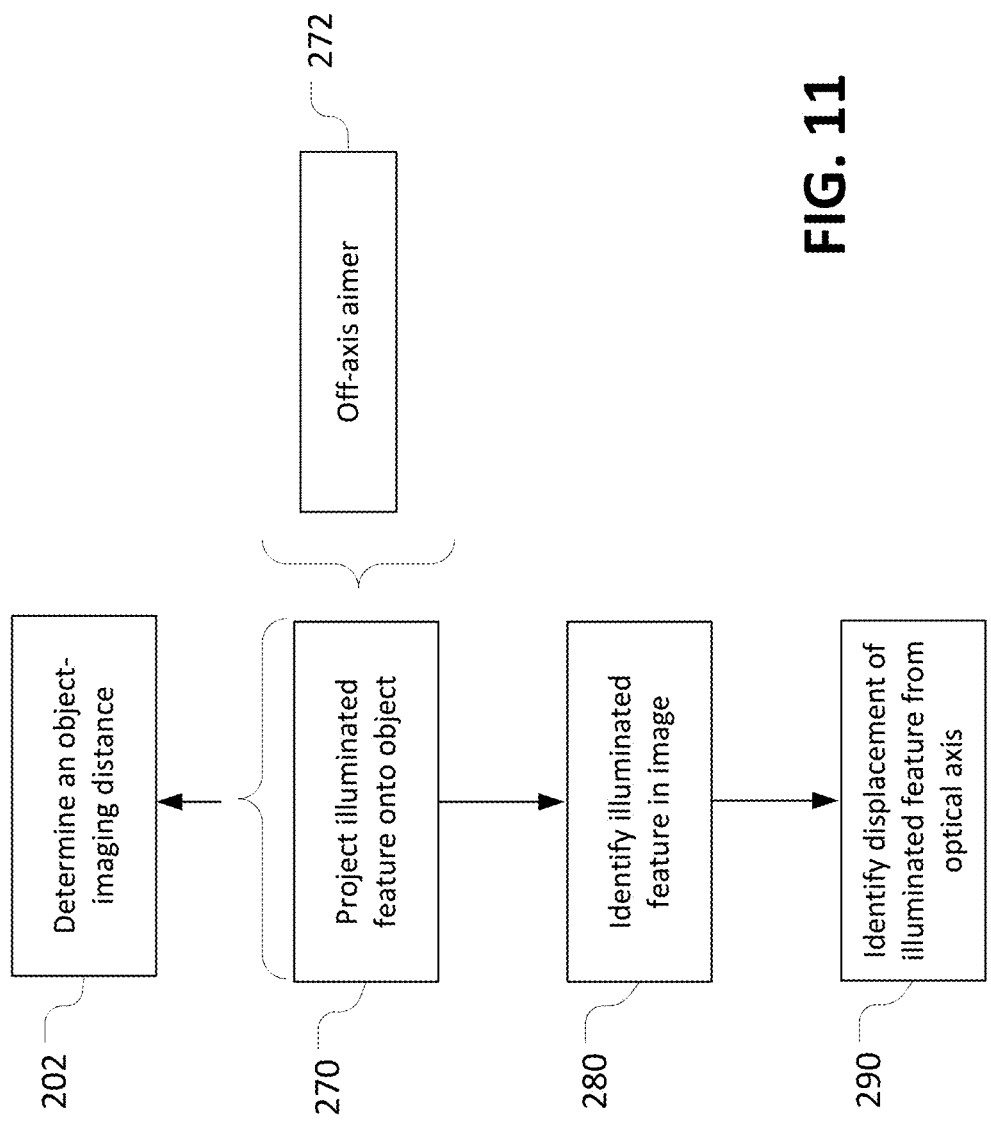
FIG. 11 is a diagrammatic view of further aspects of the method of FIG. 10, according to an embodiment of the invention.

In some implementations, as also discussed above, an object-imaging distance can be determined using an aimer, such as an off-axis aimer included in a mobile dimensioning system. In this regard, for example, as illustrated in FIG. 11, determining an object-imaging distance can be based upon projecting 270 an illuminated feature onto an object. For example, similar to the operations illustrated in FIG. 8, an aimer patter can be projected 270 onto an object by an off-axis aimer 272 of a mobile (or other) dimensioning system. The illuminated feature can then be identified 280 in the image and an object-imaging distance can be determined 202 on that basis. For example, when the off-axis aimer 272 is used, the object-imaging distance can be determined 202 based upon identifying 290, in the image, a displacement of the projected 270 (and identified 280) illuminated feature relative to the location of the relevant optical axis.

Thus, embodiments of the invention can provide improved systems and methods for determining dimensions of an object. In some implementations, use of a combination of predetermined and measured parameters can allow for improved operation of dimensioning systems, including through determination of object dimensions with relatively high accuracy, efficiency and speed, as compared to conventional systems. For example, in some embodiments, dimensioning systems according to the invention can allow dimensions of an object to be determined without requiring the use of structure light, the capture of high-focus images, the close control of ambient lighting or other imaging conditions, or the capture of multiple images.

While the invention has been described with reference to example embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for determining dimensions of an object, the system comprising:
   an imaging system that includes:
   an imaging sensor; and
   a lens arrangement that includes a lens and defines an optical axis, a field-of-view that at least partly includes the object, and a sensor-lens distance between the imaging sensor and the lens; and
   a processor device configured to:
   determine an object-imaging distance as a distance between the object and the lens arrangement;
   determine an axis angle as an angle of the optical axis relative to a gravitational reference frame;
   acquire an image of the object using the imaging sensor;
   identify one or more features of the object within the image; and
   determine one or more of the dimensions of the object based upon at least the object-imaging distance, the axis angle, and the one or more identified features of the object.

2. The system of claim 1, wherein the imaging system is a fixed-location imaging system with the object-imaging distance and the axis angle determined by a structural support system for the imaging system.

3. The system of claim 1, wherein the imaging system is included in a mobile telephone that is connected to a range finder, the range finder being configured to measure a distance to the object, to determine the object-imaging distance.

4. The system of claim 3, wherein the range finder includes an off-axis aimer; and
   wherein the processor device is further configured to determine the object-imaging distance based upon identifying in the image of the object an illuminated feature provided by the off-axis aimer.

5. The system of claim 1, wherein identifying the one or more features of the object within the image includes:
   identifying a plurality of edges of the object in the image based upon one or more of:
   identifying one or more furthest-removed lines on one or more sides of an expected geometric profile of the object;
   identifying at least one line that is proximate an illuminated feature provided by an off-axis aimer of the range finder; or
   identifying a set of candidate lines based on the expected geometric profile of the object; and
   identifying an expected line orientation based upon an orientation sensor associated with the imaging sensor.

6. A method for determining dimensions of an object, for use with an imaging system that includes an optical arrangement with an imaging sensor, a lens arrangement that defines an optical axis and a field-of-view that at least partly includes the object, and a sensor-lens distance between the imaging sensor and a focusing lens of the lens arrangement, the method being at least partly implemented using a processor device and comprising:
   determining an object-imaging distance as a distance between the object and the lens arrangement;
   determining an axis angle as an angle of the optical axis relative to a reference frame;
   acquiring an image of the object using the imaging system;
   identifying, using the processor device, one or more features of the object within the image; and
   determining, using the processor device, one or more of the dimensions of the object, based upon at least the object-imaging distance, the axis angle, and the one or more identified features of the object.

7. The method of claim 6, wherein the determining the object-imaging distance is based upon determining a distance between the object and the focusing lens.

8. The method of claim 6, wherein the object is a parallelepiped.

9. The method of claim 8, wherein the parallelepiped is a rectangular box and the one or more determined dimensions include one or more of a height of the rectangular box, a width of the rectangular box, or a depth of the rectangular box.

10. The method of claim 6, wherein identifying the one or more features includes identifying one or more points on a first facet of the object and one or more different points on a second facet of the object that is adjacent to the first facet.

11. The method of claim 10, with the imaging system defining a sagittal optical plane and a tangential optical plane, wherein the object is positioned so that the first facet is intersected by the sagittal optical plane and the first and second facets are intersected by the tangential optical plane.

12. The method of claim 11, wherein the one or more points on the first facet include a first point on a line segment at an intersection of the first and second facets and one or more points on the second facet include a second point on the line segment at the intersection of the first and second facets.

13. The method of claim 12, wherein the one or more points on the first facet include a third point on an edge of the first facet that is opposite the line segment at the intersection of the first and second facets; and
wherein the one or more points on the second facet include a fourth point on an edge of the second facet that is opposite the line segment at the intersection of the first and second facets.

14. The method of claim 10, wherein the one or more points are disposed at least one of along an edge of the object between adjacent facets of the object or at a corner at an intersection of multiple facets of the object.

15. The method of claim 14, for use with a machine vision system, further comprising:
identifying the at least one of the edge or the corner, using the machine vision system, based upon detecting at least one of an intensity edge or an intensity corner, respectively, within the image.

16. The method of claim 6, wherein identifying the one or more features of the object within the image is based upon receiving, at a computing interface, a user input that identifies a location of the one or more features of the object on a representation of the image on the computing interface.

17. The method of claim 6, wherein the object-imaging distance is determined based upon:
projecting an illuminated feature onto the object; and
identifying the illuminated feature in the image.

18. The method of claim 6, with the imaging system including an accelerometer, wherein determining one or more of the axis angle or an expected orientation of an edge of the object in the image is based upon receiving, using the processor device, signals from the accelerometer.

19. The method of claim 6, wherein, to determine the object-imaging distance, the imaging system includes one or more of:
a laser range finder, wherein determining the object-imaging distance is based upon receiving, using the processor device, signals from the laser range finder; or
an off-axis aimer, wherein determining the object-imaging distance is based upon identifying in the image, using the processor device, an illuminated feature from the off-axis aimer.

20. A mobile system for determining dimensions of an object, the mobile system comprising:
a mobile housing that supports an imaging sensor, a lens arrangement, a range finder configured to measure a distance to the object, an angular sensor configured to measure a spatial orientation of the mobile system, and a processor device;
the lens arrangement including a lens and defining an optical axis and a sensor-lens distance between the imaging sensor and the lens; and
the processor device being configured to:
determine an object-imaging distance as a distance between the object and the lens arrangement, based upon the distance measured by the range finder;
determine an axis angle as an angle of the optical axis relative to a reference frame, based upon the spatial orientation measured by the angular sensor;
acquire a single image of the object using the imaging sensor;
identify one or more features of the object within the single image based upon analysis of the single image that includes at least one of:
using a machine vision system to identify a feature of one or more of an edge, a corner, or a facet of the object within the single image; or
receiving a user input on a touchscreen of the mobile system that identifies one or more of an edge, a corner, or a facet of the object within the single image; and
determine one or more of the dimensions of the object based upon at least the object-imaging distance, the axis angle, and the one or more identified features of the object.

* * * * *